W. M. BATEMAN.
ANCHOR SHANK AND SHACKLE.
APPLICATION FILED JULY 17, 1919.
1,321,356.
Patented Nov. 11, 1919.
2 SHEETS—SHEET 1.
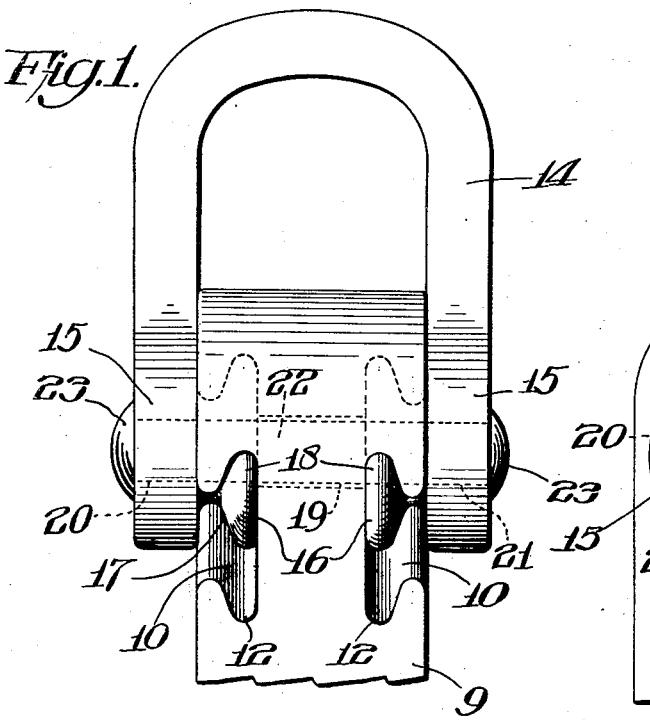
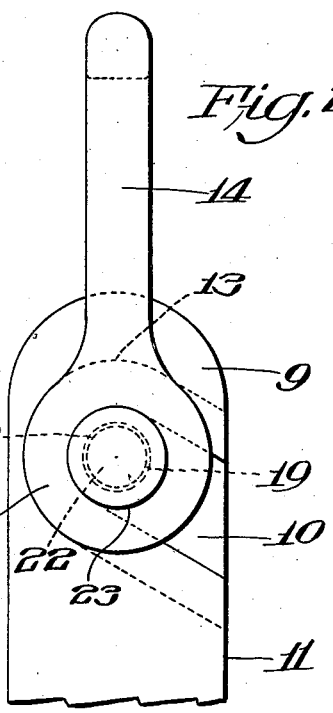
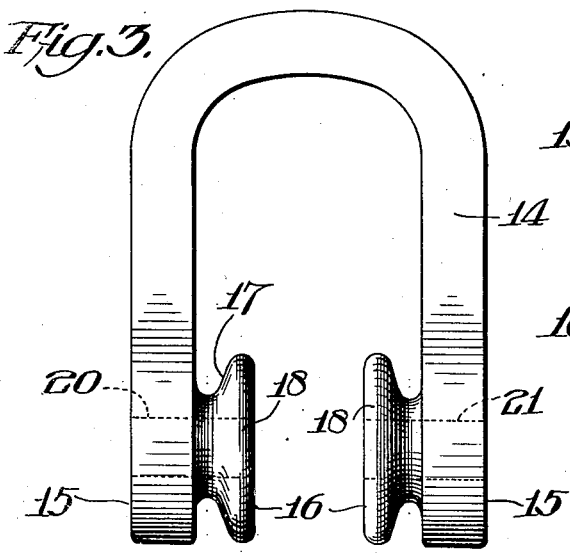
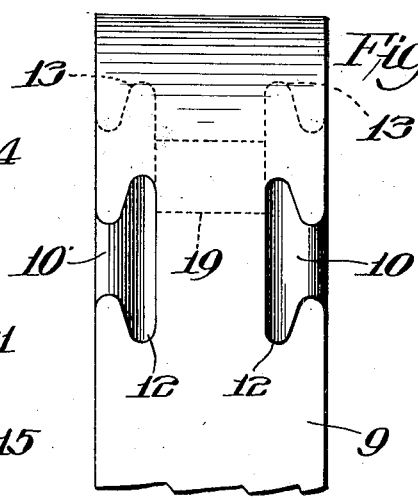
Witnesses:
R. H. Ramsell
Augustus B. Clapper
Inventor
William M. Bateman,
By Joshua R. H. Potts
his Attorney

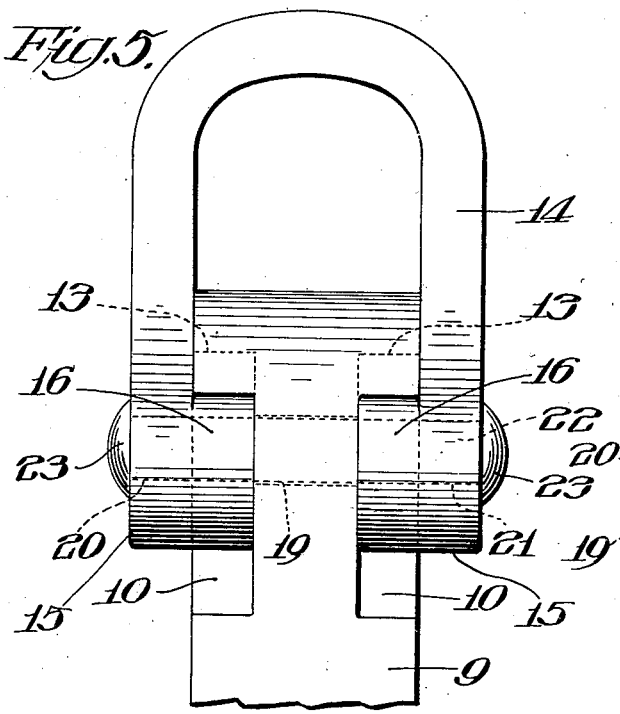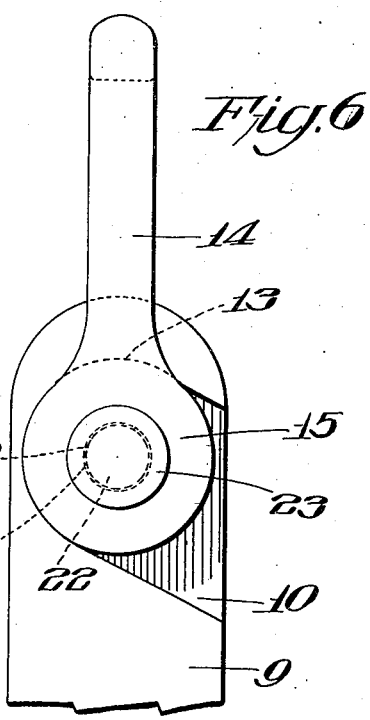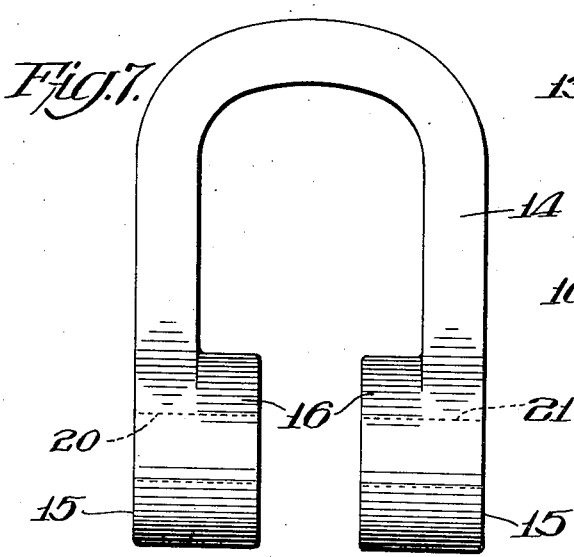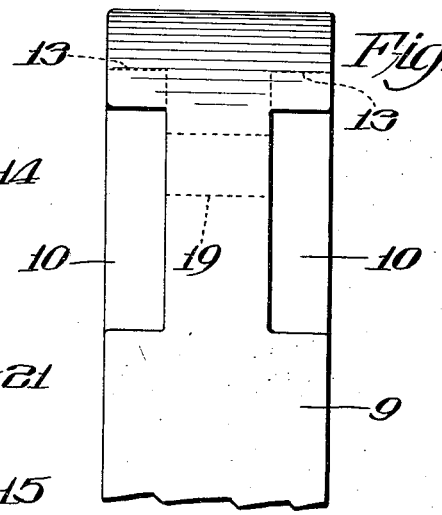

UNITED STATES PATENT OFFICE.

WILLIAM M. BATEMAN, OF CHESTER, PENNSYLVANIA.

ANCHOR SHANK AND SHACKLE.

1,321,356.   Specification of Letters Patent.   Patented Nov. 11, 1919.

Application filed July 17, 1919. Serial No. 311,470.

*To all whom it may concern:*

Be it known that I, WILLIAM M. BATEMAN, a citizen of the United States, residing at Chester, in the county of Delaware, and State of Pennsylvania, have invented certain new and useful Improvements in Anchor Shanks and Shackles, of which the following is a specification.

One object of my invention is to provide an improved anchor shank and shackle which will be so connected that they will not easily separate when performing their functions.

Another object is to so construct my invention that the shank and shackle can be easily and quickly made and connected together.

A still further object is to make my invention of a simple and durable construction.

These objects, and other advantageous ends which will be described hereinafter, I attain in the following manner, reference being had to the accompanying drawings in which—

Figure 1 is a fragmentary elevation of an anchor shank and shackle constructed in accordance with my invention, Fig. 2 is a side view of Fig. 1, Fig. 3 is an elevation of a shackle shown in Fig. 1 detached from the shank, Fig. 4 is a front elevation of the shank shown in Fig. 1 with the shackle detached, Fig. 5 is a view of similar nature to Fig. 1 showing a modified form of my invention, Fig. 6 is a side elevation of Fig. 5, Fig. 7 is a front elevation of the shackle shown in Fig. 5, and Fig. 8 is a front elevation of the shank shown in Fig. 1 and having the shackle detached therefrom.

Referring to Figs. 1 to 4 inclusive my invention includes an anchor shank 9 which has grooves 10 in its opposite faces, said grooves extending inwardly from the side 11 and upwardly at an incline as shown in Fig. 2. These grooves have undercut portions 12 and the grooves at their inner ends are arcuate, as shown at 13. A substantially U-shape shackle 14 has its sides 15 provided with inwardly projecting lugs 16, said lugs being undercut at 17 to provide heads 18. These heads are adapted to fit within the undercut portions 12 of the grooves 10 from the side 11 and the lugs 16 are made circular in cross section so as to fit the arcuate portions at 13 of said grooves 10. The shank 9 has a hole 19 extending therethrough between the grooves 10, the center or axis of said hole being coincident with the center of the arcuate portions of the groove 10. The shackle 14 has holes 20 and 21 extending through its sides and respective lugs 16, said holes 20 and 21 having their axes coincident with the centers or axes of the hole 19 and arcuate portions 13 of the grooves 10. A pivot pin or bolt 22 extends through the holes 19, 20 and 21 and this pin is riveted at its ends as shown at 23. Thus under normal operation the lugs 16 form the pivotal connecting means of the shackle with the shank and the pin 20 serves as retaining means to prevent separation of the shackle and shank. Even if the pin 20 is sheared, the lugs 16 will hold the shank until the anchor has been weighed and in this manner will prevent the anchor from becoming lost, as often occurs due to the ordinary pin connection of the shank and shackle.

The form of my invention shown in Figs. 5 to 8 inclusive is substantially similar to that of Figs. 1 to 4 inclusive with the exception that the undercut portions of the grooves and lugs are omitted. In all other respects the parts are similar to those described in connection with Figs. 1 to 4 inclusive and I have therefore given corresponding parts similar reference numerals.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. An anchor shank and shackle in which the shank has grooves in the sides thereof, said shackle having lugs extending therefrom and adapted to be slipped into said grooves, substantially as described.

2. An anchor shank and shackle in which the shank has grooves in the sides thereof, said shackle having lugs extending therefrom and adapted to be slipped into said grooves, said lugs and sides of the shackle having holes extending therethrough, said shank having a hole in alinement with the said first holes; and a pivot pin extending through the holes of said shackle and shank, substantially as described.

3. An anchor shank and shackle in which the shank has grooves in its opposite faces extending inwardly from one side and having their inner ends arcuate, a shackle having lugs curved in cross section and adapted to be slipped into said slots through the open ends thereof, and into engagement with said arcuate portions, said lugs and the sides of said shackle having holes extending therethrough, said shank having a hole extending in alinement with the holes in said shackle; and a pivot pin extending through said holes in the shackle and shank, substantially as described.

4. An anchor shank and shackle in which the shank has grooves in its opposite faces extending inwardly from one side and having their inner ends arcuate; a shackle having lugs curved in cross section and adapted to be slipped into said slots through the open ends thereof and into engagement with said arcuate portions, said lugs and sides of the shackle having holes extending therethrough, said shank having a hole extending in alinement with the holes in said shackle; and a pivot pin extending through said holes in the shackle and shank, said grooves having undercut portions and said lugs also having undercut portions forming heads for fitting the undercut portions of said grooves, substantially as described.

5. An anchor shank and shackle in which the shank has grooves in its opposite faces extending inwardly from one side and having their inner ends arcuate; a shackle having lugs curved in cross section and adapted to be slipped into said slots through the open ends thereof and into engagement with said arcuate portions, said lugs and sides of the shackle having holes extending therethrough, said shank having a hole extending in alinement with the holes in said shackle; and a pivot pin extending through said holes in the shackle and shank, said grooves extending at an incline to the length of said shank, substantially as described.

In testimony whereof I have signed my name to this specification in the presence of two subscribing witnesses.

WILLIAM M. BATEMAN.

Witnesses:
 ANNA RENTON,
 CHAS. E. POTTS.

Copies of this patent may be obtained for five cents each, by addressing the "Commissioner of Patents, Washington, D. C."